July 18, 1944.  G. O. KIMMELL  2,353,833
SEPARATOR FOR TREATING FOAMY OILS
Filed July 28, 1941  2 Sheets-Sheet 1

INVENTOR
Garman O. Kimmell.
BY
ATTORNEY

July 18, 1944.  G. O. KIMMELL  2,353,833
SEPARATOR FOR TREATING FOAMY OILS
Filed July 28, 1941  2 Sheets-Sheet 2
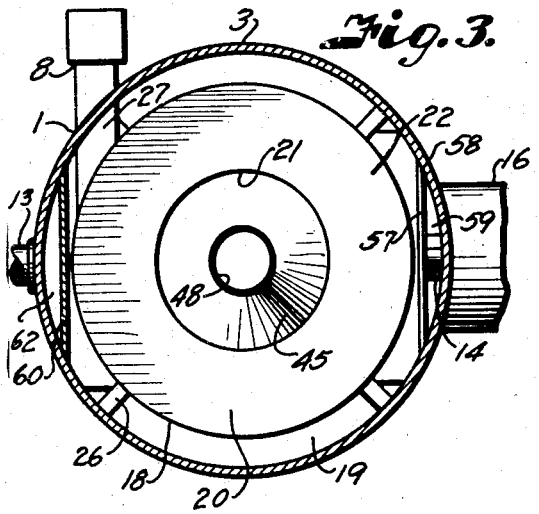
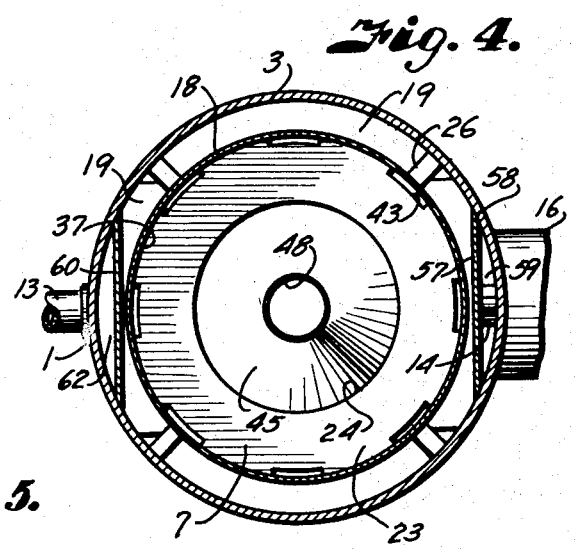
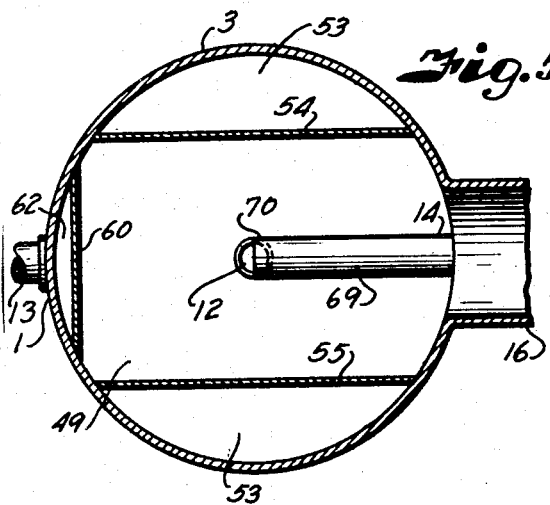
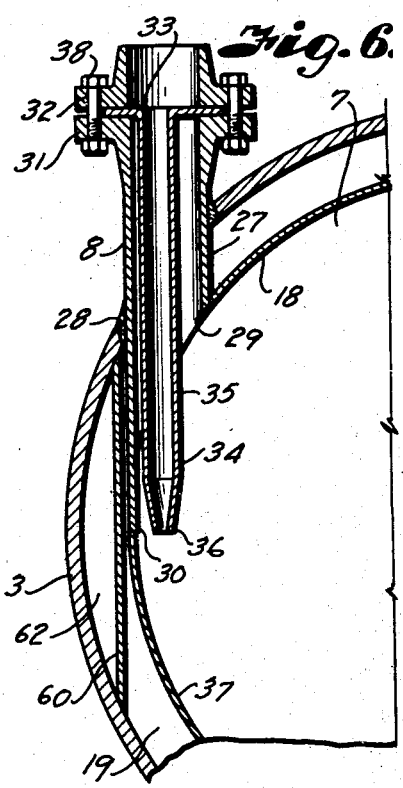
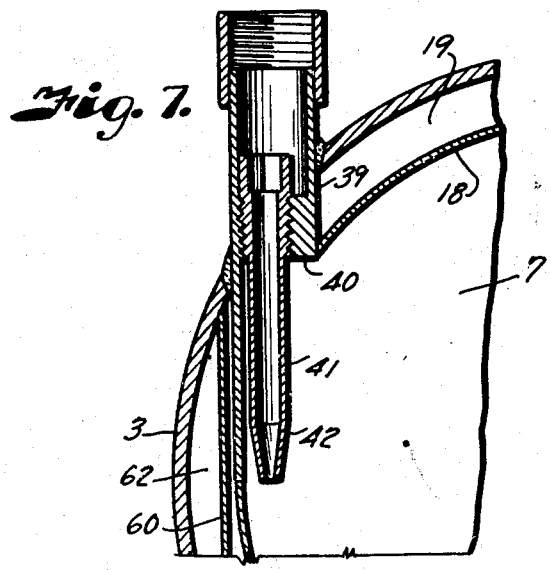
INVENTOR
Garman O. Kimmell
BY Arthur C. Brown, Jr.
ATTORNEY Patented July 18, 1944

2,353,833

UNITED STATES PATENT OFFICE 2,353,833

SEPARATOR FOR TREATING FOAMY OIL

Garman O. Kimmell, Oklahoma City, Okla.

Application July 28, 1941, Serial No. 404,296

14 Claims. (Cl. 252—361)

This invention relates to separators used in handling well flows having quantities of gas entrained with liquid, and particularly flow from wells producing foamy liquids which are difficult to break down and effect release of the entrained gas.

The principal object of the invention is to provide a separator constructed for efficiently handling foamy liquids in substantially large volume.

Other objects of the invention are to provide a separator constructed to effect classification of the liquid and foam in a primary pressure separation chamber and effect further separation in secondary and tertiary separation chambers; to provide a plurality of separation stages in differential pressure zones; to effect coalescence of the particles of liquid against the walls of the respective chambers responsive to centrifugal flow; and to provide the separator with a substantially quiescent liquid collecting zone free of the disturbances in the separating chambers.

In accomplishing these and other objects of the invention, as hereinafter pointed out, I have provided improved details of structure, the preferred forms of which are illustrated in the accompanying drawings, wherein:

Fig. 3 is a horizontal section through the upper separating chamber on the line 3—3 of Fig. 1.

Fig. 4 is a horizontal section through the primary separating chamber.

Fig. 5 is a horizontal section through the settling or collecting chamber of the separator.

Fig. 6 is a fragmentary horizontal section through the separator at the inlet thereof and particularly illustrating the nozzle for effecting maximum flow velocity.

Fig. 7 is a similar section but illustrating a modified form of nozzle.

Figures 1, 2:
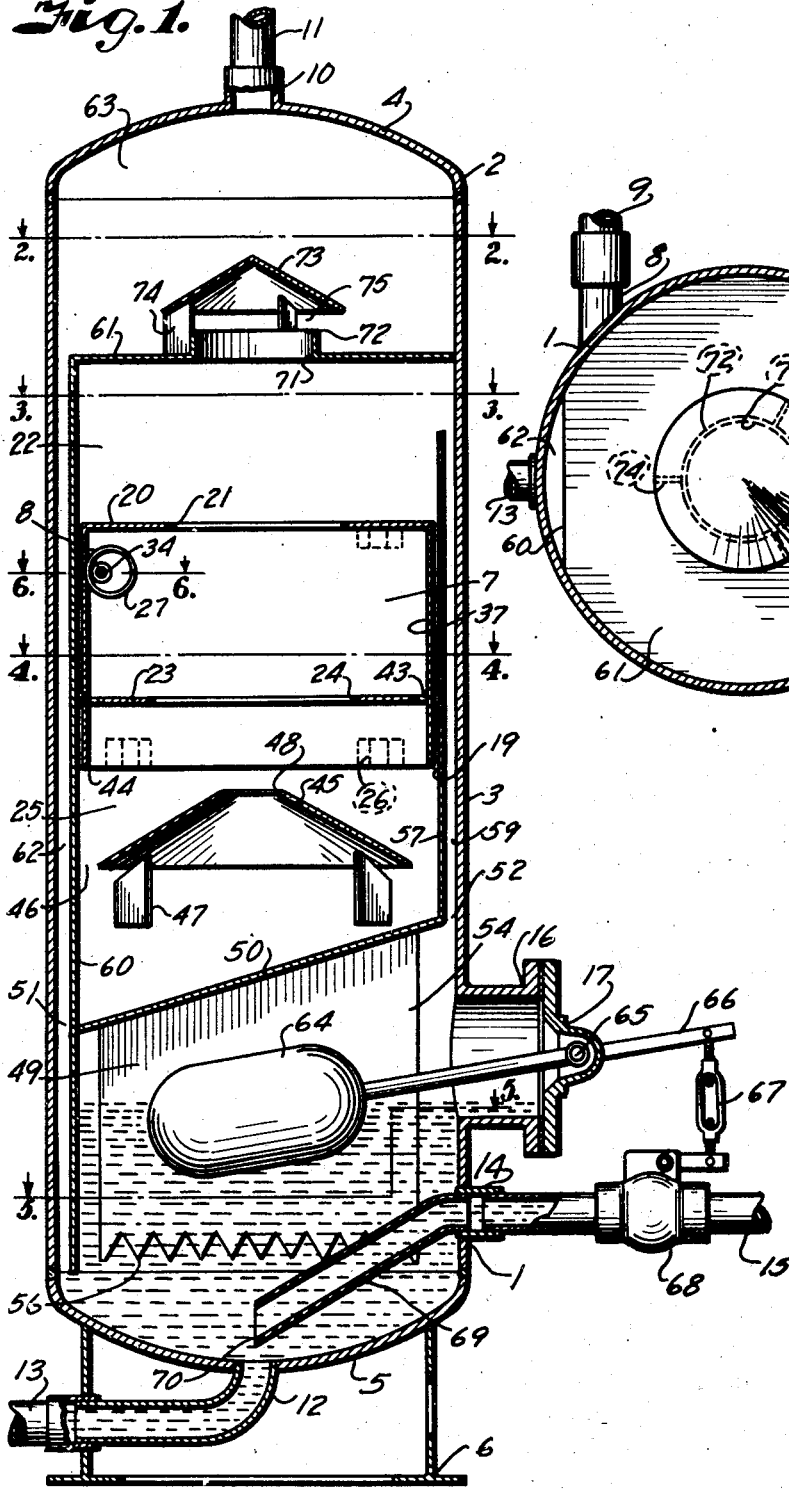
Fig. 1 is a vertical section through a separator embodying the features of the present invention.
Fig. 2 is a horizontal section through the separator on the line 2—2 of Fig. 1.

Referring more in detail to the drawings:

1 designates a separator constructed in accordance with the present invention and which includes a shell 2 having a vertically arranged cylindrical wall 3 of substantially greater height than the diameter thereof and which is closed at the ends by a head 4 and a bottom 5, the bottom of the shell being supported on a suitable stand 6. Connected with the wall of the shell intermediate the ends thereof and substantially tangential with a primary separating chamber 7 is a flow inlet connection 8 which is adapted to be connected with the flow pipe 9 of an oil well (not shown) producing foamy oil.

The head 4 of the separator has an axial outlet connection 10 with a gas discharge pipe 11 and the bottom is provided with an axial outlet 12 having connection with a drain pipe 13 through which sludge may be drained from the separator. Connected with the side wall of the shell, near the bottom thereof, is a liquid outlet connection 14 with a pipe 15 leading to a storage tank or pipe line (not shown). The side wall of the shell is further provided with a manhole 16 closed by a head plate 17.

The primary separating chamber 7 consists of a cylindrical band or wear plate 18 of smaller diameter than the inner diameter of the shell to provide a passageway 19 therearound. The top of the band carries an inwardly extending circumferential flange 20 forming a central opening 21 for the discharge of gas and foam into an upper secondary separating chamber 22, later described. Inset within the lower portion of the band is an annular plate-like ring 23 having its outer periphery engaged with the inner face of the band and its inner periphery forming a central opening 24 to a lower secondary separating chamber 25, later described.

The primary separating chamber above described is supported coaxially of the shell upon suitable brackets or spacer blocks 26 carried by the wall 3 in such a position that the inlet connection is located directly under the flange 20. The inlet connection includes a tubular neck 27 welded within an opening 28 in the wall 3 and which registers with a substantially tangential opening 29 in the band 18 to receive the shaped end 30 of the tubular neck. The outer end of the neck is provided with an annular flange 31 which cooperates with a clamping collar 32 on the pipe 9 to retain a flange head 33 of a nozzle 34 therebetween. The nozzle 34 includes a tube-like body 35 projecting through the neck 27 and having a constricted outlet 36 to discharge the well flow in tangential contact with the inner face 37 of the band 18 to effect centrifugal flow of the liquid within the primary separating chamber. The nozzle is retained in position between the flange 31 and clamping collar 32 by suitable fastening devices such as bolts 38, as shown in Fig. 6. The purpose of the nozzle is to increase velocity of the incoming flow of liquid to as high a value as possible.

In Fig. 7 a modified form of nozzle is shown wherein the inlet neck 39 has an internally threaded collar 40 to engagingly support the threaded body portion 41 of a nozzle 42, the nozzle being removable through the neck 39 upon disconnection of the flow line.

The flange 20 and ring 23 act as chokes to retain the centrifuged liquid within the primary separating chamber a sufficient time for effecting primary separation. The upper opening 21, being of smaller diameter than the opening 24, assures downward movement of the liquid component of the flow at the periphery of the chamber and upward movement of the light foam and gas into the upper secondary separation chamber. In addition to the opening 24, the ring 23 is provided with a series of preferably equally spaced slots 43 which are located in the outer edge thereof adjacent the inner face of the band 18 and which are best shown in Fig. 4. Inset of the ring 23 leaves an annular skirt 44 projecting within the lower secondary separating chamber to prevent splashing and forcing the liquid up behind the band 18 and through the annular passageway 19. The bottom of the lower secondary separating chamber consists of a truncated, cone-like baffle 45 which is of small enough diameter to provide an annular passageway 46 therearound and is supported on substantially radially arranged plate-like brackets 47 preferably welded to the rim of the cone and to the wall 3 of the shell 2. The top of the baffle extends upwardly and is provided with a central opening 48 of smaller diameter than the opening in the choke rings previously described. This opening breaks the seal formed by the liquid flowing through the passageway 46 and the bracket-like plates 47 serve as buffers for effecting a buffing action on the whirling stream of liquid as it is discharged through the passageway about the periphery of the cone and to a settling chamber 49, the top of which is formed by an inclined plate 50 extending across the interior of the shell in spaced relation below the cone and which has its upper and lower edges cut on chords of the shell 3 to provide passageways 51 and 52. The sides of the plate 50 also terminate short of the sides of the shell to provide passages 53 which connect the lower secondary separating chamber with the settling chamber. Extending downwardly from the sides of the plate 50 are wing-like plates 54 and 55 having serrated lower edges 56 spaced from the bottom 5, but which are located below the normal level of liquid carried in the settling chamber.

Connected with the edge of the plate 50 forming the opening 52 and extending upwardly through the passageway 19 is a plate 57 having the side edges 58 thereof attached to the wall 3 of the shell to form a vertical gas conduit 59. The plate extends above the flange 20 so as to prevent downflow of liquid therethrough. Likewise attached to the opposite edge of the plate 50 which forms the opening 51 is a plate 60 which extends downwardly within the settling chamber and terminates adjacent the serrations of the plates 54 and 55. The upper end of the plate extends through the passageway 19 and connects with a horizontal plate 61 which extends transversely of the shell and forms the top of the upper secondary separation chamber 22. The plate 60 has its side edges attached to the wall 3 and forms a downflow duct 62. The plate 61 also forms the bottom of a gas collecting and tertiary separating chamber 63, located directly under the head 4 and having connection with the gas outlet 10. The inclined plate 50 and side plates 54 and 55 cooperate to form a hood over a float 64 located within the settling chamber and supported by the head 17 on a cross-shaft 65, which has an arm 66 connected by a turn-buckle link 67 with a valve 68 in the discharge pipe 15. In order that the liquid may be taken from the settling chamber at as low a level as possible, the inner end of the outlet connection 14 has a downwardly extending pipe 69 having an inlet 70 located directly above the bottom 5.

The plate or baffle 61 is provided with an opening 71 which connects the upper secondary separation chamber with the gas or tertiary chamber and the opening is encircled by an upwardly extending flange 72 which forms a dike to prevent drainage of liquid therethrough but which is forced to drain through the duct 62 into the bottom of the settling chamber 49. The opening 71 is covered by a cone-like cap 73 supported by brackets 74, sufficient space 75 being allowed between the top of the dike flange 72 and the margin of the cone to permit gas to pass from the upper secondary separating chamber into the uppermost chamber without excess pressure drop.

The operation of a separator constructed and assembled as described is as follows:

A nozzle 34 is selected for size so that at capacity flow conditions, the maximum allowable pressure drop across the separator inlet is obtained. The pressure drop need not exceed 200 pounds per square inch for successful operation, but a greater pressure drop does not interfere with the principles of separation. The flow inlet is connected with the flow line of a well and the valve 68 is connected with the discharge pipe 15 leading to a suitable source of liquid storage. Upon opening the flow line from the well, the well flow is discharged through the nozzle 34 at substantially high velocity and is violently circumvolved or rotated in the primary separating chamber between the flange 20 and ring 23. The centrifugal force produced incidental to the rotating stream of gas-oil performs the first step in separation. The foam and oil are classified in a layer against the cylindrical wall 18 of the primary separating chamber under substantial pressure created by the centrifugal force of the rapidly moving stream. The pressure of the whirling stream is greater than exists in the upper and lower secondary separating chambers and by reason of this greater pressure the centrifuged or separated oil which is nearest the surface of the band 18 is forced out through the slots 43 into the lower secondary separating chamber. At low rates of flow some foam may pass out through the slots 43 and at high or near capacity rates the unseparated foam spills out over the inside margins of the ring 23. Sufficient energy of the rotating fluid in the primary chamber passes out through the opening 24 to rotate the fluid in the lower secondary separating chamber. Rotation of the foam and liquid mass in the lower secondary separation chamber performs the second step of separation. The solid oil passing through the slots 43 spirals down the skirt 44 and wall 3 of the shell through the passageway 46 surrounding the baffle 45 where it contacts the plates 47, the plates 47 acting as buffers to retard whirling action of the liquid so that it will flow down the wall 3 and through the openings 53 into the settling chamber 49.

At low and high rates of flow, the unseparated foam also drains down through the passageway 46. At all but extremely low rates of flow a foam level builds up under the cone-like baffle 45 and the space between the plate 50 and cone-like baffle provides for tertiary separation. Gas liberating from the foam under the cone-like baffle passes up through the hole 48 of the baffle 45. As the oil and remaining traces of foam pass under the serrated edges of the wings 54 and 55, gas bubbles in the foam rise through the oil and foam inside the float canopy. The gas liberated from the foamy oil passes out through the vent or conduit 59 into the upper secondary separating chamber. Thus the settling chamber provides for a fourth and final separation step. The solid oil gravitates to the bottom of the settling chamber and discharges through the valve 68 when a head of liquid accumulates in the settling chamber to actuate the float 64.

Rotation of the liquid and foam layer in the primary separating chamber and the energization thereof by the velocity stream from the nozzle create some undesirable splattering so that some liquid droplets are driven through the opening 21 along with the separating gas which rises therethrough into the upper secondary separating chamber. The gas also carries the finer droplets or mist into the upper secondary chamber. The rotating stream in the primary separating chamber persists through the opening 21 and creates a similar rotating effect within the upper secondary separating chamber. The centrifugal force throws the liquid droplets and small bubbles of foam out against the wall 3 of the shell 2 and the liquid droplets and foam bubbles coalesce thereon and run down through the passageway 19 into the lower secondary separating chamber. The separated gas rises upwardly and passes with the gas moving through the vent or conduit 59 into the upper gas collecting chamber through the opening 71, where the gas is given a final chance to drop its burden of liquid particles since the velocity thereof is greatly reduced so that this chamber also provides a tertiary separation of the liquid from the gas. Particles of liquid impinging on the cone-like cap 73 drip off the edge thereof onto the plate 61. This liquid is prevented from draining back through the opening 71 by the flange 72 and all of the liquid collecting in the gas chamber flows downwardly through the duct 62 into the settling chamber. Since the duct 62 extends below the level of liquid carried in the settling chamber the liquid forms a seal so that the gas separating in the settling chamber is prevented from flowing through the duct 62.

From the foregoing it is obvious that I have provided a separator which is especially adapted for efficiently separating gas and liquid from a foamy well flow and which is capable of treating well flows of substantially large volume.

What I claim and desire to secure by Letters Patent is:

1. In a separator of the character described, a primary separating chamber, secondary separating chambers located respectively above and below the primary separating chamber and having connections therewith through axially arranged openings, means for effecting circumvolution of a combined liquid and gas flow in the primary separating chamber to effect primary separation of the liquid from the gas and foam components of the flow to cause discharge of gas and lighter foam into the upper secondary separating chamber and heavier foam through the larger opening into the lower secondary separating chamber, a gas collecting chamber having connection with the upper secondary separating chamber, a settling chamber having connection with the lower secondary separating chamber, means for discharging gas from the gas collecting chamber, means for discharging liquid from the settling chamber, and a cone-like baffle supported in the lower secondary separating chamber for collecting foam under said cone-like baffle and having an apical opening to effect release of the gas component of said foam.

2. In a separator of the character described, a primary separating chamber, secondary separating chambers located respectively above and below the primary separating chamber and having connections therewith through axially arranged openings, means for effecting circumvolution of a combined liquid and gas flow in the primary separating chamber to effect primary separation of the liquid from the gas and foam components of the flow, said opening to the upper secondary separating chamber being of smaller diameter than the opening to the lower secondary separating chamber to cause discharge of gas and lighter foam into the upper secondary separating chamber and heavier foam through the larger opening into the lower secondary separating chamber, a gas collecting chamber having connection with the upper secondary separating chamber, a settling chamber having connection with the lower secondary separating chamber, means for discharging gas from the gas collecting chamber, means for discharging liquid from the settling chamber, and a cone-like baffle supported in the lower secondary separating chamber for collecting foam under said cone-like baffle and having an apical opening to effect release of the gas component of said foam.

3. In a separator of the character described, a primary separating chamber, secondary separating chambers located respectively above and below the primary separating chamber and having connections therewith through axially arranged openings, means for effecting circumvolution of a combined liquid, foam and gas flow in the primary separating chamber to effect primary separation of the liquid from the gas and foam components of the flow to cause discharge of gas and lighter foam into the upper secondary separating chamber and heavier foam through the larger opening into the lower secondary separating chamber, and a cone-like baffle supported in the lower secondary separating chamber for collecting foam under said baffle which is carried into said chamber, said cone having an apical opening to effect release of gas contained in said collected foam.

4. A separator of the character described including, a vessel, a primary separating chamber in the vessel having connection with the upper and lower secondary separating chambers, a settling chamber in the lower portion of the vessel and having connection with said secondary separating chambers, a baffle in the lower secondary separating chamber for collecting foam carried into said chamber, buffers supported below the periphery of the baffle for retarding circumvolution of liquid in the lower portion of the lower secondary separating chamber, a gas collecting chamber in the top of the vessel having connection with the upper secondary separating chamber, a gas outlet connected with the gas collecting chamber, a liquid outlet connected with the settling chamber, and means for introducing a combined flow of gas and liquid into the primary chambers, said means being arranged to effect circumvolution of the flow in said separation chamber for effecting centrifugal separation of liquid and gas components of the flow and discharge into the secondary separating chambers.

5. A separator of the character described including, a substantially elongated cylindrical vessel, means supporting the vessel with the axis thereof in perpendicular position, a primary separating chamber having a cylindrical wall supported in spaced relation with the wall of the vessel to form a passageway therearound, an annular flange extending inwardly from the top of said wall of the primary separating chamber and forming an axial opening to an upper secondary separating chamber in said vessel, a ring-like baffle carried by the lower portion of said cylindrical wall and forming a series of liquid outlets adjacent the cylindrical wall for discharge of separated liquid and a central outlet opening for discharge of foam to a lower secondary separating chamber, said cylindrical wall extending into the secondary chamber to form a skirt for guiding the separated liquid, and means for tangentially discharging a gas and liquid flow for circumvolution in the primary separating chamber to effect separation of the gas and liquid components of the flow incidental to centrifuging and discharge of gas through the first mentioned opening into the upper secondary separating chamber and discharge of foam through the last named opening into the lower secondary separating chamber, said ring having outlets adjacent said cylindrical wall for discharging the separated liquid component of the flow from the primary chamber into the lower secondary separating chamber.

6. A separator of the character described including, a substantially elongated cylindrical vessel, means supporting the vessel with the axis thereof in perpendicular position, a primary separating chamber having a cylindrical wall supported in spaced relation with the wall of the vessel to form a passageway therearound, an annular flange extending inwardly from the top of said wall of the primary separating chamber and forming an axial opening to an upper secondary separating chamber in said vessel, a ring-like baffle carried by the lower portion of said cylindrical wall and forming an outlet opening to a lower secondary separating chamber, and means for tangentially discharging a gas and liquid flow for circumvolution in the primary separating chamber to effect separation of the gas and liquid components of the flow incidental to centrifuging and discharge of gas through the first mentioned opening into the upper secondary separating chamber and discharge of foam through the last named opening into the lower secondary separating chamber, said ring having outlets adjacent said cylindrical wall for discharging the separated liquid component of the flow from the primary chamber, said foam and gas being circumvolved in said secondary chambers responsive to circumvolution of the flow in the primary chamber to effect separation of liquid from the gas and breaking down of said foam.

7. A separator of the character described including, a substantially elongated cylindrical vessel, means supporting the vessel with the axis thereof in perpendicular position, a primary separating chamber having a cylindrical wall supported in spaced relation with the cylindrical wall of the vessel to form a passageway therearound, an annular flange extending inwardly from the top of said wall of the primary separating chamber and forming an axial opening to an upper secondary separating chamber in said vessel, a ring-like baffle carried by the lower portion of said cylindrical wall and forming an outlet opening to a lower secondary separating chamber, means for tangentially discharging a combined gas and liquid flow for circumvolution in the primary separating chamber to effect separation of the gas and liquid components of the flow incidental to centrifuging and discharge of gas through the first mentioned opening into the upper secondary separating chamber and discharge of foam through the last named opening into the lower secondary separating chamber, said ring having an opening adjacent said cylindrical wall for discharging the separated liquid component of the flow from the primary chamber, said foam and gas being circumvolved in said secondary chambers responsive to circumvolution in the primary chamber to effect separation of liquid from the gas and breaking down of said foam, a settling chamber in the vessel below the lower secondary separating chamber, and a duct connecting the settling chamber with the upper secondary separating chamber.

8. A separator of the character described including, a vessel, a primary separating chamber having a cylindrical wall supported in spaced relation with the wall of the vessel to form a passageway therearound, an annular flange extending inwardly from the top of said wall of the primary separating chamber and forming an axial opening to an upper secondary separating chamber in said vessel, a ring-like baffle carried by the lower portion of said cylindrical wall and forming an outlet opening to a lower secondary separating chamber, means for tangentially discharging a combined gas and liquid flow for circumvolution in the primary separating chamber to effect separation of the gas and liquid components of the flow incidental to centrifuging and discharge of gas through the first mentioned opening into the upper secondary separating chamber and discharge of foam through the last named opening into the lower secondary separating chamber, said rings having outlets adjacent said cylindrical wall for discharging the separated liquid component of the flow from the primary chamber, said foam and gas being circumvolved in said secondary chambers responsive to circumvolution in the primary chamber to effect further separation of liquid from the gas and breaking down of said foam, a settling chamber in the vessel below the lower secondary separating chamber, a gas collecting chamber above the upper secondary separating chamber, and a duct connecting the gas collecting chamber with the settling chamber.

9. A separator of the character described including, a vessel, a primary separating chamber having a cylindrical wall supported in spaced relation with the wall of the vessel to form a passageway therearound, an annular flange extending inwardly from the top of said wall of the primary separating chamber and forming an axial opening to an upper secondary separating chamber in said vessel, a ring-like baffle carried by the lower portion of said cylindrical wall and forming an outlet opening to a lower secondary separating chamber, means for tangentially discharging a combined gas and liquid flow for circumvolution in the primary separating chamber to effect separation of the gas and liquid components of the flow incidental to centrifuging and discharge of gas through the first mentioned opening into the upper secondary separating chamber and discharge of foam through the last named opening into the lower secondary separating chamber, said ring having outlets adjacent said cylindrical wall for discharging the separated liquid component of the flow from the primary chamber, said foam and gas being circumvolved in said secondary chambers responsive to circumvolution in the primary chamber to effect further separation of liquid from the gas and breaking down of said foam, a settling chamber in the vessel below the lower secondary separating chamber, a duct connecting the settling chamber with the upper secondary separating chamber, a gas collecting chamber above the upper secondary separating chamber, and a duct connecting the gas collecting chamber with the settling chamber.

10. A separator including a vessel, vertically spaced means dividing the vessel substantially horizontally into a primary separating chamber having upper and lower axial outlets, upper and lower secondary separating chambers connected with the primary separating chamber through said axial outlets, a gas collecting space in the upper portion of the vessel having connection with the upper secondary separating chamber and a liquid collecting space in the lower portion of the vessel having connection with the lower separating chamber, means for admitting a liquid and gas flow for circumvolution in said primary chamber to promote initial separation of the liquid from the gas and foam component of the flow and cause discharge of the gas and lighter foam into the upper secondary separating chamber and liquid and heavier foam into the lower secondary chamber so that vortexes are formed in said secondary separating chambers, said upper and lower secondary chambers being interconnected circumferentially of the primary separating chamber for discharge of separated liquid from the upper secondary chamber into the lower secondary chamber, means for discharging separated gas from the upper portion of the vessel, and means for discharging liquid from the lower portion of the vessel.

11. A separator including a vessel, vertically spaced means dividing the vessel horizontally into a primary separating chamber having upper and lower axial outlets, upper and lower secondary separating chambers connected with the primary separating chamber through said axial outlets, a gas collecting space in the top of the vessel and a liquid collecting space in the bottom of the vessel, means connected with the primary separating chamber for effecting circumvolution of a liquid and gas flow in said chamber to promote initial separation of the liquid from the gas and foam component of the flow and cause discharge of the gas and lighter foam into the upper secondary separating chamber and heavier foam into the lower secondary separating chamber so that vortexes are formed in said secondary separating chamber, said lower secondary chamber having an opening to pass separated liquid to the collecting space and the upper separating chamber having an opening to pass the separated gas to the gas collecting space, means for maintaining level of the collected liquid below the bottom of the lower secondary separating space, and means for discharging separated gas from the upper portion of the vessel, said secondary separating chambers being interconnected by a passageway by-passing the primary separating chamber and said primary chamber having separate liquid outlet openings into the lower separating chamber.

12. A separator including a vessel having a vertically arranged cylindrical wall, an annular wall within the vessel and spaced from the cylindrical wall to provide a passageway from the upper portion of the vessel to a liquid collecting and settling space in the lower portion of the vessel, means cooperating with the annular wall to form a primary separating chamber having upper and lower axial outlets, means positioned in the vessel above and below the primary separating chamber to provide upper and lower secondary separating chambers connected with the primary separating chamber through said axial outlets, means connected with the primary separating chamber for effecting admission of a liquid and gas flow in circumvolution within said primary separating chamber to promote initial separation of the liquid from the gas and foam component of the flow and cause discharge of the gas and lighter foam into the upper secondary separating chamber and heavier foam into the lower secondary separating chambers for breaking down the foam, means for discharging liquid from the collecting and settling chamber, means for controlling said discharge of liquid to maintain the level of the liquid in said liquid collecting and settling space below said bottom of the lower secondary separating chamber, and means for discharging separated gas from the upper portion of the vessel.

13. A separator including a vessel having a vertically arranged cylindrical wall, an annular wall within the vessel and spaced from the cylindrical wall to provide a passageway from the upper portion of the vessel to a liquid collecting and settling space in the lower portion of the vessel, means cooperating with the annular wall to form a primary separating chamber having upper and lower axial outlets, means positioned in the vessel above and below the primary separating chamber to provide upper and lower secondary separating chambers connected with the primary separating chamber through said axial outlets, means connected with the primary separating chamber for effecting admission of a liquid and gas flow in circumvolution within said primary separating chamber to promote initial separation of the liquid from the gas and foam component of the flow, said outlet to the upper secondary separating chamber being of smaller diameter than the opening to the lower secondary separating chamber to cause discharge of the gas and lighter foam into the upper secondary separating chamber and heavier foam into the lower secondary separating chamber so that vortexes are formed in said secondary separating chambers, for breaking down said foam, means for discharging liquid from the collecting and settling space, for maintaining a level of the liquid in said liquid collecting and settling space below said bottom of the lower secondary separating space, and means for discharging separated gas from the upper portion of the vessel.

14. A separator of the character described including a vessel, a primary separating chamber in the vessel having connection with upper and lower secondary separating chambers in said vessel, a settling chamber in the lower portion of the vessel below the lower secondary separating chamber and having connection with said secondary separating chambers, said lower secondary separating chamber having a bottom substantially separating said chamber from the settling chamber, a gas collecting chamber in the top of the vessel having connection with the upper secondary separating chamber, a gas outlet connected with the gas collecting chamber, said secondary chambers being connected circumferentially of the primary separating chamber for discharge of separated liquid from the upper secondary chamber into the lower secondary chamber, a liquid outlet connected with the settling chamber, and means for introducing a combined flow of gas and liquid into the primary chamber, said means being arranged to effect circumvolution of the flow in said secondary separating chamber for effecting centrifuging separation of liquid and gas components of the flow.

GARMAN O. KIMMELL.